United States Patent [19]

Muscroft

[11] Patent Number: 5,515,570
[45] Date of Patent: May 14, 1996

[54] MANUALLY OPERATED MAGNETIC WINDOW WIPER

[76] Inventor: Robert Muscroft, 2875 Trinity St., Vancouver, B.C., Canada, V5K 1E8

[21] Appl. No.: 419,724

[22] Filed: Apr. 10, 1995

[30] Foreign Application Priority Data

Dec. 16, 1994 [CA] Canada ................................. 2138328

[51] Int. Cl.⁶ ............................................... A47L 1/08
[52] U.S. Cl. ................. 15/220.2; 15/250.28; 15/250.11; 15/245; 15/210.1
[58] Field of Search .................... 15/220.2, 103, 15/250.11, 218, 219, 245, 250.28, 210.1

[56] References Cited

U.S. PATENT DOCUMENTS

| | | | |
|---|---|---|---|
| 2,507,559 | 5/1950 | D'Andrea | 15/220.2 |
| 2,634,444 | 4/1953 | Coleman | 15/220.2 |
| 2,700,171 | 1/1955 | Wiest, Jr. | 15/220.2 |
| 2,805,438 | 9/1957 | Hogensen | 15/220.2 |
| 2,958,019 | 10/1960 | Scholten et al. | 15/220.2 |
| 3,108,307 | 10/1963 | Redrow | 15/220.2 |
| 3,208,090 | 9/1965 | Roesel, Jr. | 15/220.2 |
| 3,492,685 | 2/1970 | Curzon | 15/220.2 |
| 3,600,737 | 8/1971 | Shore | 15/220.2 |
| 3,751,750 | 8/1973 | Kaftan | 15/220.2 |
| 3,839,085 | 10/1974 | Hulvey et al. | 15/220.2 |
| 3,922,747 | 12/1975 | Kaftan | 15/220.2 |
| 4,144,091 | 3/1979 | Tran | 15/220.2 |
| 4,977,637 | 12/1990 | Demers | 15/220.2 |
| 5,105,501 | 4/1992 | Douglas | 15/256.35 |

FOREIGN PATENT DOCUMENTS

| | | | |
|---|---|---|---|
| 1288099 | 2/1962 | France | 15/220.2 |
| 181865 | 7/1994 | Japan | 15/103 |
| 888344 | 1/1962 | United Kingdom | 15/220.2 |

*Primary Examiner*—Gary K. Graham

[57] ABSTRACT

A tool for wiping windows by means of a ceramic rectangular permanent magnet, or magnets, which has wiper blades attached. This unit is called the slave unit. On the opposite side of the window surface is a ceramic rectangular permanent magnet or magnets, which is called the master unit. When the two units are placed opposite each other across the window surface the magnetic attraction pulls the slave unit wiper blades against the window surface. When the master unit is moved across the window surface, the slave unit follows in unison on the other side and the wiper blades flip-flop wiping the window clear.

1 Claim, 4 Drawing Sheets

1

MANUALLY OPERATED MAGNETIC WINDOW WIPER

BACKGROUND OF THE INVENTION

The field of invention relates to a vehicular window wiper, more particularly the side windows. The instant invention is accomplished by the use of magnetic attraction through a window surface, one unit of the invention has wiper blades attached.

BACKGROUND—CROSS REFERENCE TO RELATED APPLICATIONS

A patent has been applied for this instant invention in Canada Certificate Number 2138328 filed Dec. 19, 1994. The instant invention was applied for using the same enclosed drawings.

BACKGROUND—DISCUSSION OF PRIOR ART

For a few years I have been trying to think of some way to improve your vision out of the side window of a vehicle much the same as the front windshield. I tried different methods over the top of the glass etc. I was told drilling a hole through the glass was not feasible. Then one day, I thought of using magnets and experimented for a few weeks and devised working models of different strengths for different thicknesses of glass and air space.

I cannot find any prior art that compares with the purpose of my invention or the construction of same. I do not envision any disadvantages to the instant invention. It can only be an advantage for increased visibility through a window and automobile driving safety.

The following prior art patents with the exception of U.S. Pat. No. 5,105,501 to Okeefe, Douglas 1992 Apr. 21, all relate to the cleaning of windows and none of the other listed patents have wiper blades. The aforementioned patent is for defoggings the inside window of a vehicle and is dependent on the outer windshield electrically operated wipers. My instant invention is totally independent.

LIST OF PRIOR ART

U.S. Pat. No. 5,105,501 to Okeefe, Douglas Apr. 21/1992 "Windshield defogging device"
U.S. Pat. No. 4,977,637 to Rodney C. Demers filed Feb. 16/1990 "magnetic cleaning apparatus"
U.S. Pat. No. 3,731,337 to John S. Doyel filed Dec. 3/1971 "Magnetic window cleaning device"
U.S. Pat. No. 3,609,793 to John A. Kaftan filed Mar. 17/1969 "magnetic window cleaning apparatus"
U.S. Pat. No. 3,600,737 to Melvin Shore filed Jan. 5/1970 "Apparatus for cleaning windows"
U.S. Pat. No. 3,402,685 to Joseph H. Curzon Filed Mar. 22/1968 "Window washing device"
U.S. Pat. No. 3,759,621 to Joseph P. Decarlo Appl. Oxr 7/1971 "Window cleaning apparatus" U.S. Pat. No. 3,7 51,7 50 to John A Kaftan Appl. Nov. 19/1970 "Magnetic window cleaning apparatus with improved cleaning material and locator"

The instant inventions primary function is to clear a side window instantly for improved vision when required, it is unique in its design and purpose. The aforementioned devices are primarily used for washing windows.

2

The objects of my invention will become apparent from consideration of the drawings and ensuing description of it in which there is illustrated preferred embodiments of the invention:

The aforementioned description of the instant invention should not be construed as limitations on the scope of the invention, but rather as an exemplification of one preferred embodiment thereof. Many other variations of use are possible.

SUMMARY OF THE INVENTION

A manually operable magnetic apparatus for wiping windows or some other compatable surface free of moisture and or pollutants. Comprising of two rectangular molds made of plastic or other composition. One of the rectangular molds is fitted with wiper blades and the molds are placed opposite each other through a window surface. They are held there by their magnetic attraction. When you move the inside Master Unit the Slave Unit, which is fitted with wiper blades, follows in unison along the window surface. Thus wiping the outer surface.

The instant invention wipes the side windows of any vehicle as clear as the front windshield wipers do. The device can also clear areas on the front windshield which the conventional blades cannot reach. The device can be used in an emergency, and there is only one moving part.

The wiper blades and or accessories are replaceable,the unit is portable,and does not require soaps,cleaning fluids or wiping cloth and does increase a drivers visibility with a simple instant wipe back and forth,and is relatively maintenance free. My device can be used in explosive areas such as wheat elevators where dust is present and a window needs to be cleared. The device can also be used where oxygen is present and a spark would be fatal,it can also be used on any type of vehicle whether in outer space, on land sea or air. The instant invention can be used on aquarium windows or fish tanks, as well as other surfaces such as plastic, wood etc. The instant invention clears off a fogged up inside window at the same time it clears the outer surface. The raised portion on the back of the master unit will also be used for attaching an extention when needed,as well as being used for a grip. The device can also be used for clearing off view windows in your home, apartment or office.

DESCRIPTION OF THE PREFERRED EMBODIMENTS

Figure 1:
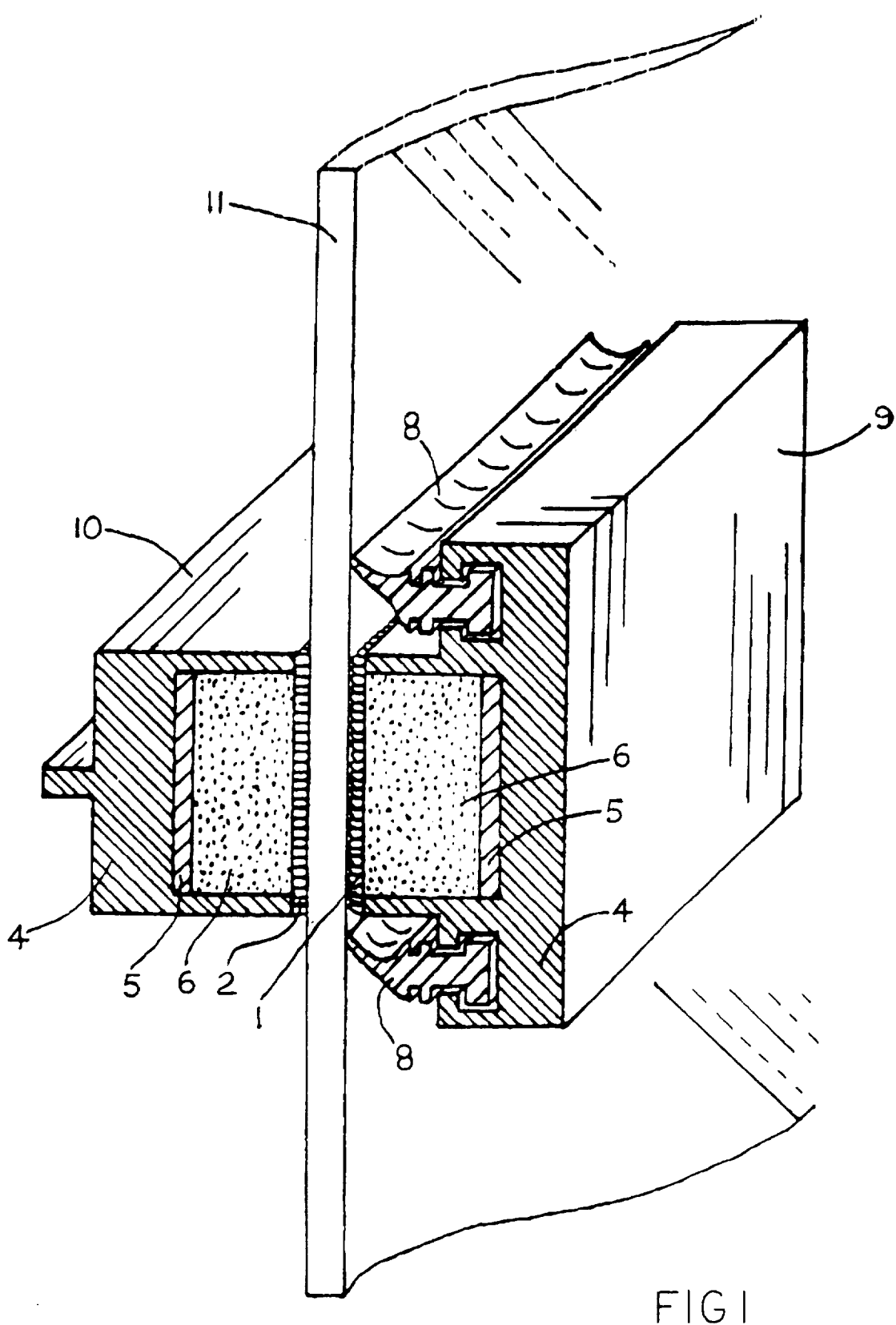
FIG. 1 Is a perspective sequential view of the Slave Unit along with the Master Unit. The wiper blades are indicating a downward motion.
Figure 2:
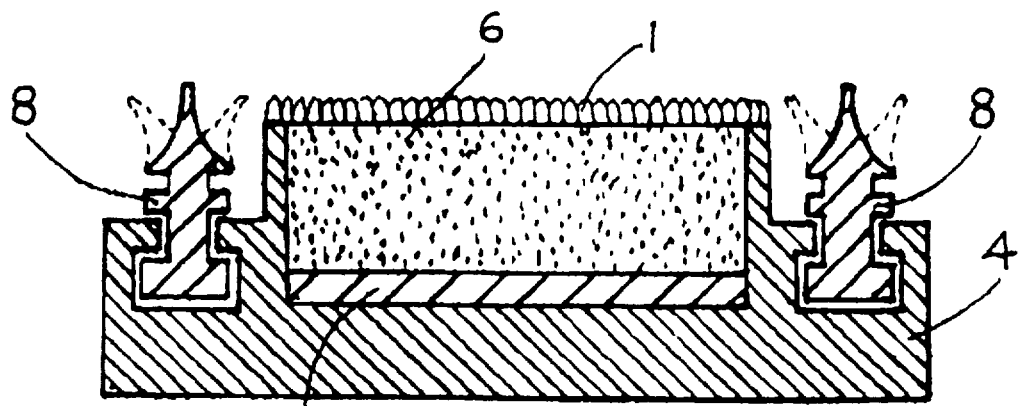
FIG. 2 Is an end view of one embodiment of this invention namely the Slave Unit.
Figure 3:
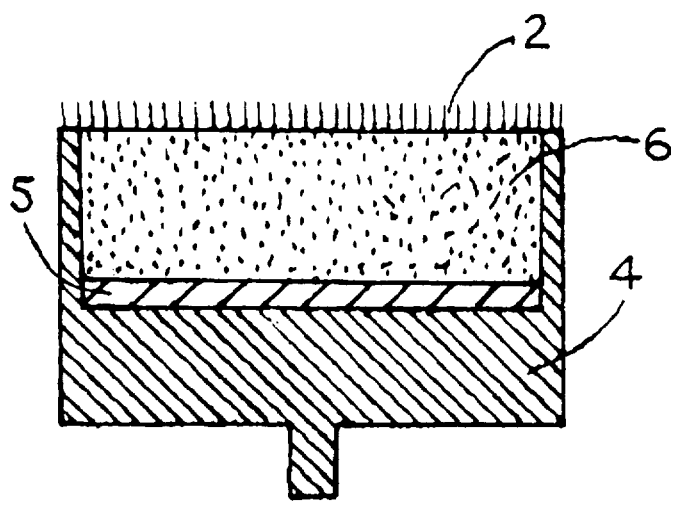
FIG. 3 Is an end view of another embodiment of this invention namely the Master Unit.
Figure 4:
FIG. 4 Is an end view of the plastic insert which is one of the embodiments of the Slave Unit.

With reference now to the drawing,and in particular FIG. 1–7 thereof a unique method of wiping windows in a vehicle or other structure. The window wiper device embodying the principles and elements of the instant invention, and are generally designated by the reference numbers 9 and 10. Fig. 1 Shows all elements of the instant invention except insert 3 (FIG. 4). The slave unit 9 is fitted with wiper blades 8. The wiper blades 8 are drawn into the longitudinal channels and are held in place on each end by inserts 3 (Fig.4). The inserts are pressed into the ends of the channels. The inserts 3 (Fig.4) are removeable for replacing the wiper blades 8 or other accessories. The Slave Unit 9 and the Master Unit 10 are made from a mold of plastic or other composition, fitted within these two molds 4, are metal plates 5 and magnets 6 said magnets have upper and lower surfaces. The metal plates 5 adhered to the magnets 6 act as an armature for greater flux density, hence greater pullpower. The magnets 6 have Velcro or hook and loop fastening material layers 1 and 2 respectively adhered on their outer surfaces for ease of gliding the units across a glass surface. When the Slave Unit 9 and the Master Unit 10 are placed opposite each other across the window surface 11, the magnetic attraction holds the units to the window surface 11. When the Master Unit 10 is drawn across the window surface 11, the Slave Unit 9 follows in unison, and the wiper blades 8 wipe the window 11 clear.

FIG. 2 Shows the Slave Unit 9 illustrating the wiping action of the conventional wiper blades 8, which are shown in the mold 4 longitudinal side channels.

FIG. 3 Shows the Master Unit 10, and depicts a raised area on the back of the unit. This raised area is for gripping the mold 4 and for fitting an extention when needed.

FIG. 4 Shows the holding insert 3 (FIG. 4) alluded to in (FIG. 1), description for holding the wiper blades 8, or other accessories in place on mold 4 longitudinal channels.

Figure 5:
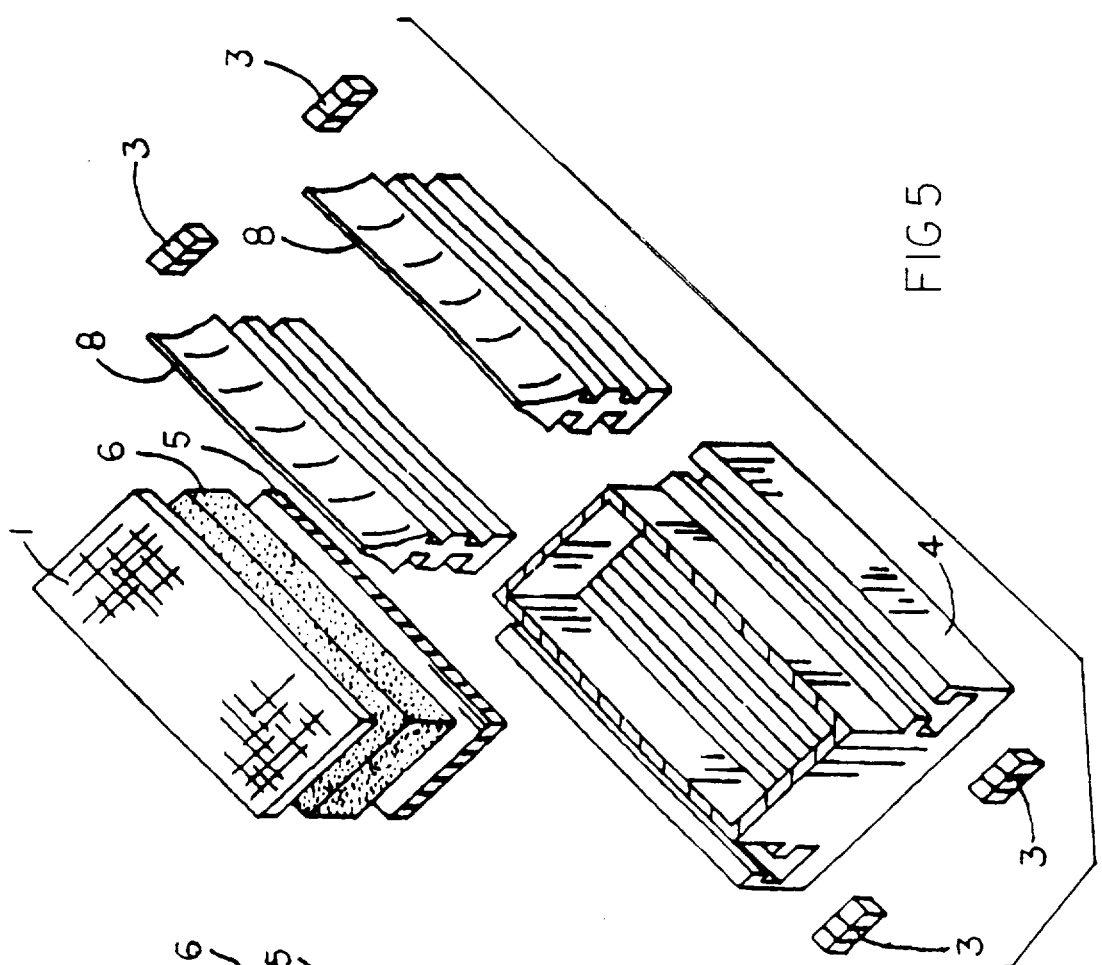
FIG. 5 Is a sectional view of several embodiments of the invention which makes up the Slave Unit.

FIG. 5 Shows all the elements of the Slave Unit 9 the wiper blades 8 are then inserted into the side channels of mold 4. The metal plate 5 is then glued into the bottom of the rectangular void in the mold 4, followed by the magnet 6 which is then glued to the metal plate 5. Then the Velcro i (hook side) is adhered to the outer face of the magnet 6.

Figure 6:
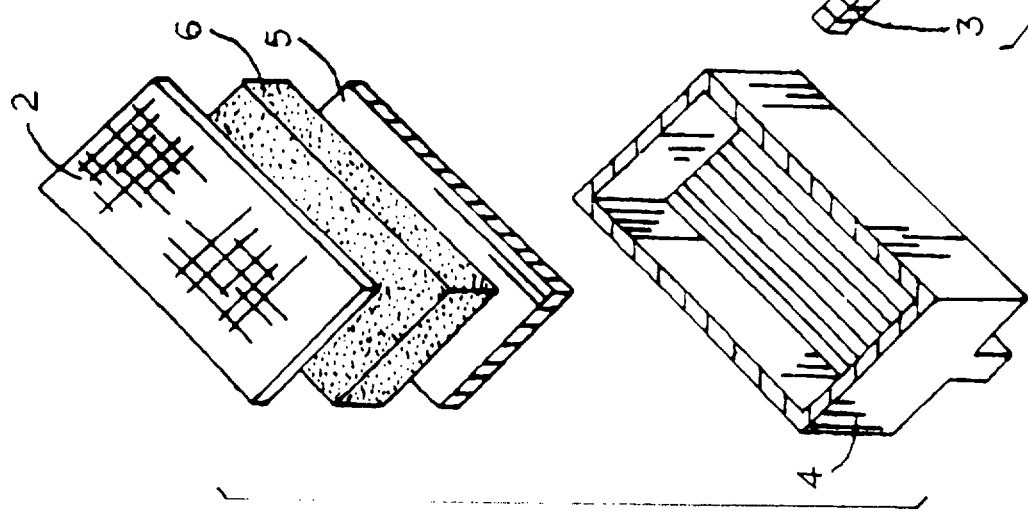
FIG. 6 Is a sectional view of several embodiments of the invention which makes up the Easter Unit.

FIG. 6 Shows several elements of the Master Unit 10. The metal plate 5 is then glued into the bottom of the rectangular void in the mold 4, followed by the magnet 6 which is then glued to the metal plate 5. Then the Velcro 2 (loop side) is adhered to the outer face of the magnet 6.

Figure 7:
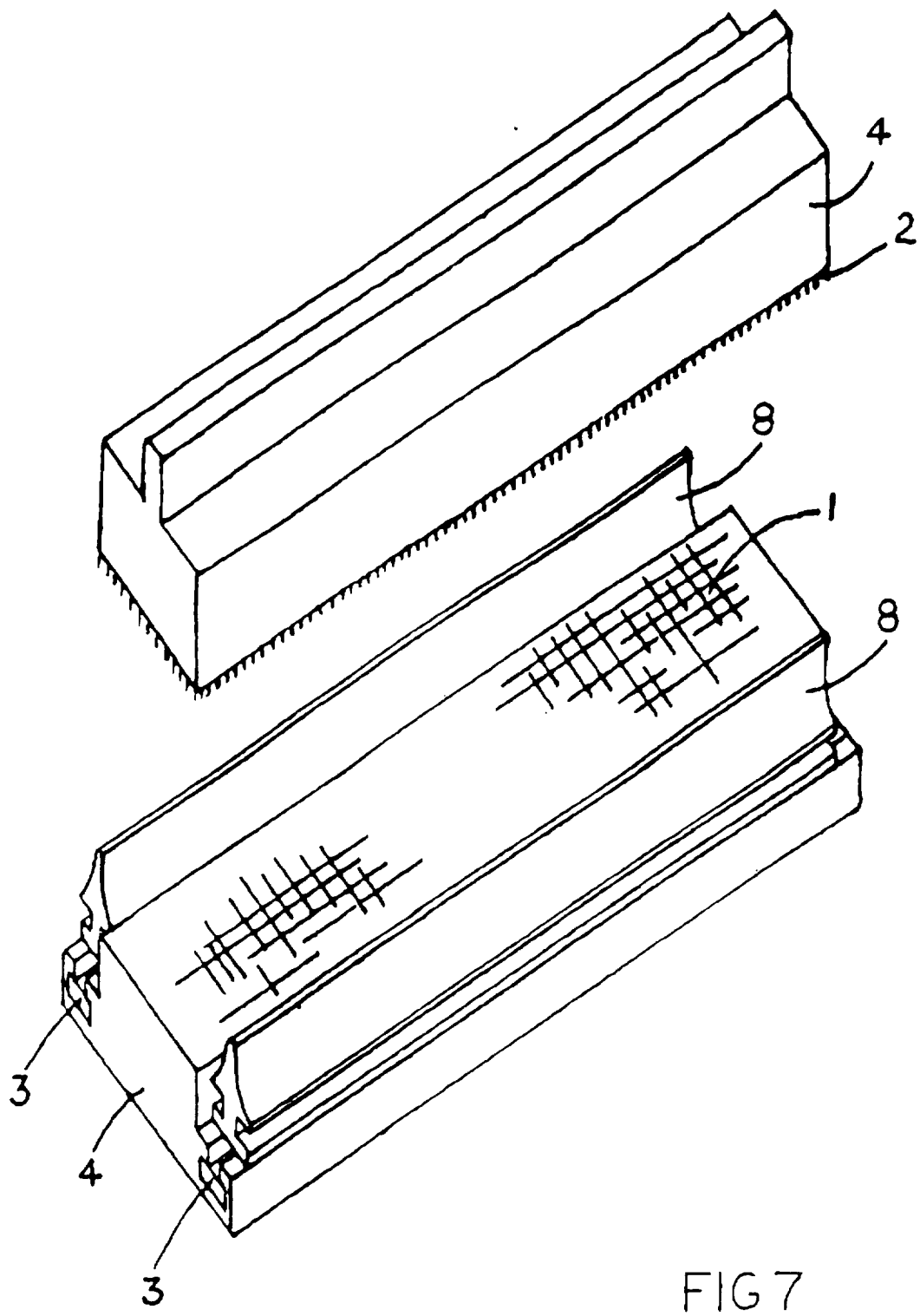
FIG. 7 Is a perspective plan view of the embodiments of the invention in their assembled entirety.

FIG. 7 Shows the Master Unit 10 in its entirety, with a raised area longitudinally situated on the backside for gripping or attaching an extention arm when required.

FIG. 7 also shows the Slave Unit 9 in its entirety, in this drawing the inserts 3 (FIG. 4) are in place.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, number of certain elements, method of manufacturing, materials, shape, form, function, and manner of operation, assembly and use, or addition to, are deemed readily apparent and obvious to one skilled in the art, and all equivelant relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivelants may be resorted to, falling within the scope of the invention.

What is claimed as being new and desired to be protected by Letters Patent of the United States is as follows:

1. A magnetic window cleaning apparatus comprising a master unit and a slave unit, said units adapted to be disposed on opposite sides of a window pane in magnetically coupled relationship for cleaning both sides of said window pane as said apparatus is moved thereover;

said master unit comprises a first elongated body which includes an elongated cavity therein, said cavity defines a lower planar surface which has attached thereto a metal plate, a first magnet having an upper and lower surface is provided in said cavity with said upper surface coupled with said metal plate, one layer of a hook and loop fastening material is attached to the lower surface of the first magnet and adapted to engage a first side of said window pane;

said slave unit comprises a second elongated body which includes an elongated cavity therein and a pair of elongated T-shaped channels laterally spaced on opposite sides of the cavity, said cavity defines a lower planar surface which has attached thereto a metal plate, a second magnet having an upper and lower surface is provided in said cavity with said upper surface coupled with said metal plate, the other layer of the hook and loop fastening material is attached to the lower surface of the second magnet and adapted to engage a second side of said window pane, each channel has mounted therein a wiper blade, each wiper blade has a T-shaped head portion which is received in the T-shaped channel, said wiper blades are held in said channels, respectively, by insert means which engage in said channels, and said wiper blades are adapted to engage and wipe said second side of said window pane as the apparatus is move thereover.

* * * * *